United States Patent Office 3,481,613
Patented Dec. 2, 1969

3,481,613
STATIC FLUID-TIGHT SEALS
Royston George Walter Hathaway, Santa Monica, Calif., assignor to British Aircraft Corporation Limited, London, England, a British company
Filed Sept. 26, 1966, Ser. No. 581,857
Int. Cl. F16j 15/02, 15/00
U.S. Cl. 277—207          7 Claims

ABSTRACT OF THE DISCLOSURE

A seal between two plane surfaces is formed by a ring of rubber-like material having two opposite distinct facings, each composed of a ring of resilient metal of concave-convex cross-section with the concave surface facing outwardly. The edges of each ring are angular and outwardly directed so as to engage the flat face of the members between which a seal is to be accomplished.

---

According to the present invention a sealing member for use between two static faces comprises a main ring of rubber-like material with two opposite facings, each consisting of a ring of resilient material, harder than the rubber-like material, of concave-convex strip-like cross section with its concave surface exposed.

For the majority of purposes it is convenient for the rings to be circular and for the four free edges of the facings to lie in two planes perpendicular to the axis of the rings. Further preferred features will be described with reference to such a shape of member, one example of which is shown in the accompanying drawings, in which.

This sealing member consists of a main ring 2 of rubber-like material, with two opposite facings 4, of harder material. As an example, the rubber-like material may be a silicone rubber, and the other material may be a stainless steel. The main ring and facings are circular about an axis X—X. The dimensions of the example shown in FIGURE 1 are, in inches:

A, 0.25; B, 0.20; C, 0.25; D, 0.20; E, 0.022 (24 S.W.G.); F, 0.20.

It will be seen that each facing 4 is, in section, a circular arc, and the radius of the arc D is equal to the width B of the facing. The same dimensions of the cross section of the sealing member can be used with considerable variations in the internal radius A of the rings. For other sizes of cross section, the relative proportions may remain similar to those shown in FIGURE 1.

Figure 1:
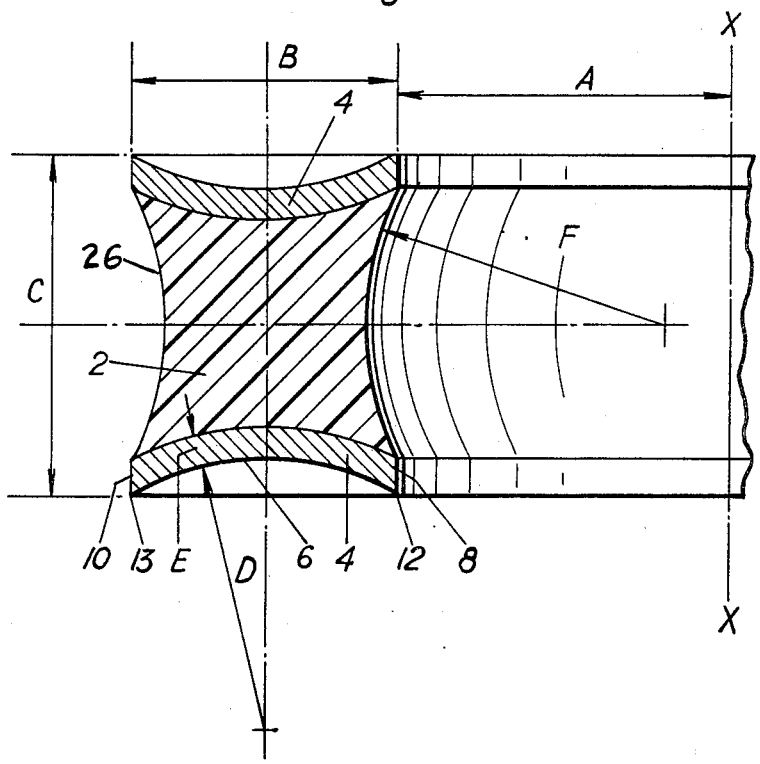
FIGURE 1 is a greatly enlarged radial section of a sealing member.

Each concave surface 6 of a facing, considered in cross section as shown in FIGURE 1, meets inner and outer circumferential surfaces 8, 10 of the facing at acute angles. It is the edges 12, 13 formed at the angles, which makes sealing contact when the member is in use.

Figure 2:
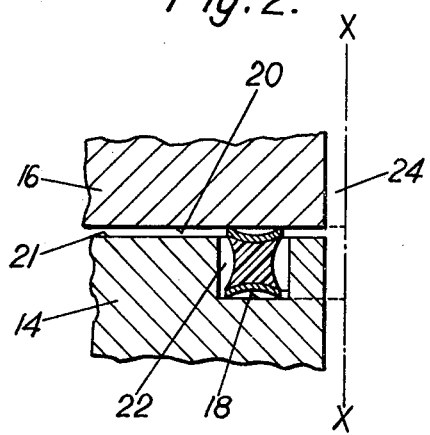
FIGURE 2 is a radial section of a seal constituted by the sealing member.

FIGURE 2 shows one example of a condition of use. Two relatively static members 14, 16 have opposed faces 18, 20. The sealing member is received into a groove 22 in one of the members 14, the face 18 being the bottom of the groove. The member provides a seal where a passage 24 crosses the joint between the members. Preferably the members 14, 16 are urged together, in a direction parallel to the axis X—X, by means not shown, until faces 20 and 21 abut, and thus limit compression of the sealing member. The effect of the compression of the sealing member is to cause the main ring 2 of rubber-like material to be appreciably compressed, while the cross sections of the facings become somewhat flattened, and the edges 12, 13 of each facing make sealing engagement with the respective faces 18, 20.

The free faces 26 of the main ring 2 are concave, as shown, so that, when the seal is compressed, the consequent lateral spread of the central parts of the main ring does not bring it into contact with the sides of the groove 22.

As alternatives to the shape shown, the invention may be embodied in seals in which the rings are non-circular; for example the rings might be shaped in plan as a rectangle with rounded corners, while having a cross section throughout as shown in FIGURE 1.

As further alternatives, seals according to the invention may be used between faces which are not flat and parallel. For this purpose the cross section may be somewhat modified, for example to fit against a conical or a part-spherical face.

I claim:
1. A sealing member between two relatively static faces, comprising a main ring of rubber-like material, said main ring having a radially inner free face and a radially outer free face, each of which is concave, and two side faces, each of which is concave, each of said two side faces having a distinct facing, each facing consisting of resilient metal of concave-convex strip-like cross-section, with its concave surface exposed and presenting two angular outwardly directed knife edges in line contact with a respective one of the static faces.

2. A sealing member according to claim 1, in which the rubber-like material is a silicone rubber, and the resilient metal is a stainless steel.

3. A sealing member according to claim 1, in which the rings are circular and the four free edges of the facings lie in two planes perpendicular to the axis of the rings.

4. A sealing member according to claim 1, in which each facing is, in section, a circular arc.

5. A sealing member according to claim 4, in which the radius of the circular arc is about equal to the width of the facing.

6. A sealing member according to claim 1, in which each concave surface of a facing, considered in cross section, meets inner and outer circumferential surfaces of the facing at acute angles.

7. A sealing member according to claim 1 in which the inner and outer circumferential surfaces of the facings are substantially flat.

References Cited

UNITED STATES PATENTS

| 2,967,727 | 1/1961 | Wills | 277—229 X |
| 1,635,482 | 7/1927 | Joyce | 277—228 |
| 3,322,433 | 5/1967 | Rentschler | 277—228 |

FOREIGN PATENTS

| 1,152,478 | 2/1958 | France. |
| 495,874 | 11/1938 | Great Birtain. |
| 6407937 | 9/1965 | Netherlands. |
| 111,319 | 11/1917 | Great Britain. |
| 80,656 | 6/1934 | Sweden. |

LAVERNE D. GEIGER, Primary Examiner

J. S. MEDNICK, Assistant Examiner

U.S. Cl. X.R.

277—206, 235